(12) United States Patent
Matsui

(10) Patent No.: US 8,589,719 B2
(45) Date of Patent: Nov. 19, 2013

(54) CONTROL APPARATUS AND METHOD, AND SIGNAL PROCESSING APPARATUS

(75) Inventor: Hideki Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 420 days.

(21) Appl. No.: 13/025,390

(22) Filed: Feb. 11, 2011

(65) Prior Publication Data

US 2011/0241807 A1    Oct. 6, 2011

(30) Foreign Application Priority Data

Mar. 31, 2010  (JP) .................................. 2010-084049

(51) Int. Cl.
*G06F 1/00*    (2006.01)

(52) U.S. Cl.
USPC .......................................................... 713/501

(58) Field of Classification Search
USPC ................... 710/301–304; 713/500–503, 322
See application file for complete search history.

(56) References Cited

U.S. PATENT DOCUMENTS

| | | | | |
|---|---|---|---|---|
| 5,130,664 A | * | 7/1992 | Pavlic et al. | 330/55 |
| 5,365,229 A | * | 11/1994 | Gardner et al. | 340/855.4 |
| 5,568,610 A | * | 10/1996 | Brown | 714/48 |
| 5,664,118 A | * | 9/1997 | Nishigaki et al. | 710/304 |
| 5,670,916 A | * | 9/1997 | Korn | 333/18 |
| 5,752,011 A | * | 5/1998 | Thomas et al. | 713/501 |
| 5,761,479 A | * | 6/1998 | Huang et al. | 710/301 |
| 5,896,449 A | * | 4/1999 | Oshidari et al. | 379/347 |
| 6,047,026 A | * | 4/2000 | Chao et al. | 375/233 |
| 6,337,878 B1 | * | 1/2002 | Endres et al. | 375/229 |
| 6,363,490 B1 | * | 3/2002 | Senyk | 713/300 |
| 6,392,376 B1 | | 5/2002 | Kobayashi et al. | |
| 6,577,677 B1 | * | 6/2003 | Hara | 375/219 |
| 7,003,228 B2 | * | 2/2006 | Wang et al. | 398/85 |
| 7,065,301 B2 | * | 6/2006 | Shastri et al. | 398/183 |
| 7,136,240 B2 | * | 11/2006 | Yoshida et al. | 360/39 |
| 7,336,729 B2 | * | 2/2008 | Agazzi | 375/316 |
| 7,339,987 B2 | * | 3/2008 | Gazsi et al. | 375/229 |
| 7,386,414 B2 | * | 6/2008 | Aguilar et al. | 702/130 |
| 7,516,226 B2 | | 4/2009 | Ahmed et al. | |
| 7,801,211 B2 | * | 9/2010 | Ichiyama et al. | 375/232 |
| 8,005,180 B2 | * | 8/2011 | Fujinuma et al. | 375/371 |
| 8,135,100 B2 | * | 3/2012 | Beukema et al. | 375/350 |
| 8,370,113 B2 | * | 2/2013 | Batruni | 702/190 |
| 2009/0190283 A1 | * | 7/2009 | Hammerschmidt et al. | 361/240 |
| 2012/0256569 A1 | * | 10/2012 | Kawahara et al. | 318/139 |

FOREIGN PATENT DOCUMENTS

| | | | | |
|---|---|---|---|---|
| DE | 19824201 A1 | * | 12/1998 | ............... H02H 5/04 |
| JP | 2000-235769 A | | 1/2000 | |
| JP | 2001-268978 A | | 9/2001 | |
| JP | 2005043143 A | * | 2/2005 | ............... G01K 7/00 |
| JP | 2006-109443 A | | 4/2006 | |

* cited by examiner

*Primary Examiner* — Paul R Myers
(74) *Attorney, Agent, or Firm* — Fujitsu Patent Center

(57) ABSTRACT

A control apparatus controls a signal processing unit. The signal processing unit is mounted within a case and includes a waveform shaping unit which performs a waveform shaping process on an inputted signal. The control apparatus includes: an obtaining device which obtains (i) mounting information indicating a mounting state of the signal processing unit, (ii) temperature information indicating a temperature of the signal processing unit, and (iii) processing unit characteristic information indicating characteristics unique to the signal processing unit; and an adjusting device which adjusts waveform shaping characteristics of the waveform shaping unit, on the basis of the mounting information, the temperature information and the processing unit characteristic information.

10 Claims, 9 Drawing Sheets

CONTROL APPARATUS AND METHOD, AND SIGNAL PROCESSING APPARATUS

CROSS-REFERENCE TO RELATED APPLICATIONS

This application is based upon and claims the benefit of priority of the prior Japanese Patent Application No. 2010-084049, file on Mar. 31, 2010, the entire contents of which are incorporated herein by reference.

FIELD

The present invention relates to a control apparatus and method for controlling an operation of a signal processing unit which performs signal processing such as at least one of a signal transmission process and a signal reception process, and a signal processing apparatus including the signal processing unit and the control apparatus.

BACKGROUND

As a communication apparatus for communication, such as a transmission apparatus and a switching equipment, there is used a bookshelf-type communication apparatus in which a plurality of printed-circuit board units (hereinafter referred to as plug in units (PIUs)) having signal processing circuits such as electronic circuit packages are mounted on a back wiring board (BWB) installed on the rear of a metal shelf (i.e. case).

In recent years, more numbers of PIUs may be mounted on one communication apparatus. Furthermore, long-distance and speeding up (in other words, improvement in transmission performance) for the transmission of a signal on the BWB may be preferred. As one example of method for the improvement in transmission performance, there has been suggested a method for mounting a waveform shaping function, such as a FFE (Feed Forward Equalizer) function performed on the signal transmission side and a DFE (Decision Feedback Equalizer) function performed on the signal reception side, on the PIU in a Serdes (Serializer/De-Serializer) circuit used in the signal transmission/reception.

Patent document 1: Japanese Patent Application Laid Open No. 2001-268978

SUMMARY

There could be several tens of thousands of types of combinations between the waveform shaping characteristics (e.g. an equalizer set value) of the FFE function performed on the signal transmission side and the waveform shaping characteristics of the DFE function performed on the signal reception side, depending on the using environment of the PIU. If the actual waveform shaping characteristics, realized by the FFE function or the DFE function, deviate from proper or optimum waveform shaping characteristics, that may cause an increase of a waveform distortion, an increase of a jitter component or embedding of a signal component, which is technically problematic. This technical problem becomes more significant as a signal transmission rate is higher. Therefore, if the FFE function and the DFE function are mounted on the PIU, it is preferable to properly determine the waveform shaping characteristics so as to perform normal or optimal communication.

On the other hand, the using environment such as the individual variations of the PIUs, the temperatures of the PIUs, and the mounting states of the PIUs may sequentially change with the use of the communication apparatus. However, the waveform shaping characteristics is not determined in accordance with the subsequent change of the using environment. This could result in such a technical problem that although the waveform shaping characteristics are optimal when the waveform shaping characteristics are determined, the subsequent change of the using environment may make it impossible to properly transmit the signal.

The aforementioned technical problem can occur not only on the communication apparatus but also on a signal processing apparatus for performing any signal processing (e.g. a signal processing apparatus for transmitting a signal, to which predetermined signal processing is performed on a signal processing unit, to another signal processing unit via the BWB).

According to an embodiment, a control apparatus includes an obtaining device and an adjusting device. The control apparatus controls a signal processing unit which is mounted within a case. The signal processing unit includes a waveform shaping unit which performs a waveform shaping process on an inputted signal. The obtaining device obtains at least one of (i) mounting information indicating a mounting state of the signal processing unit within the case, (ii) temperature information indicating a processing unit temperature which is a temperature of the signal processing unit, and (iii) processing unit characteristic information indicating characteristics unique to the signal processing unit. The adjusting device adjusts waveform shaping characteristics of the waveform shaping unit, on the basis of at least one of the mounting information, the temperature information and the processing unit characteristic information obtained by the obtaining device.

According to an another embodiment, a control method performs the same operation as that performed by the obtaining device described above and the same operation as that performed by the adjusting device described above is performed.

According to an another embodiment, a signal processing apparatus includes the aforementioned case, the aforementioned signal processing unit, and the aforementioned control apparatus.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT

Hereinafter, the embodiment of the present invention will be explained with reference to the drawings. In the following embodiment, as one example of the "signal processing unit", an explanation will be given on a "plug in card unit" for performing signal transmission/reception (i.e. at least one of the signal transmission and the signal reception) via a back wiring board. In the following embodiment, as one example of the "signal processing apparatus", an explanation will be given on a "communication apparatus" on which a plurality of plug in card units are mounted. However, the structure explained below may be applied not only to the communication apparatus but also to an arbitrary signal processing apparatus in which two signal processing units mutually transmit and receive a signal via an internal channel.

(1) Structure of Communication Apparatus

Figure 1:
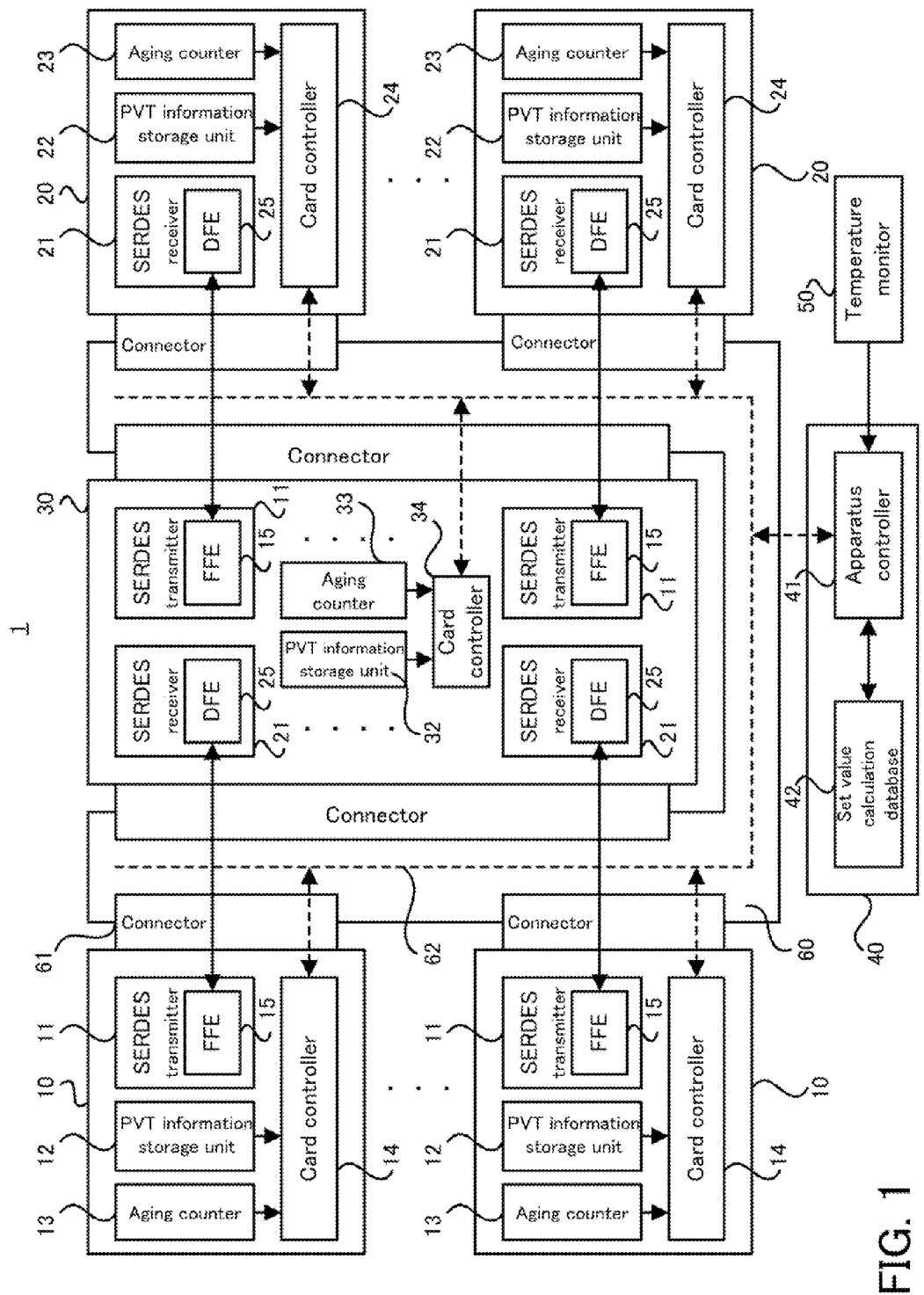
FIG. 1 is a block diagram illustrating one example of the structure of a communication apparatus in an embodiment.
Figure 2:
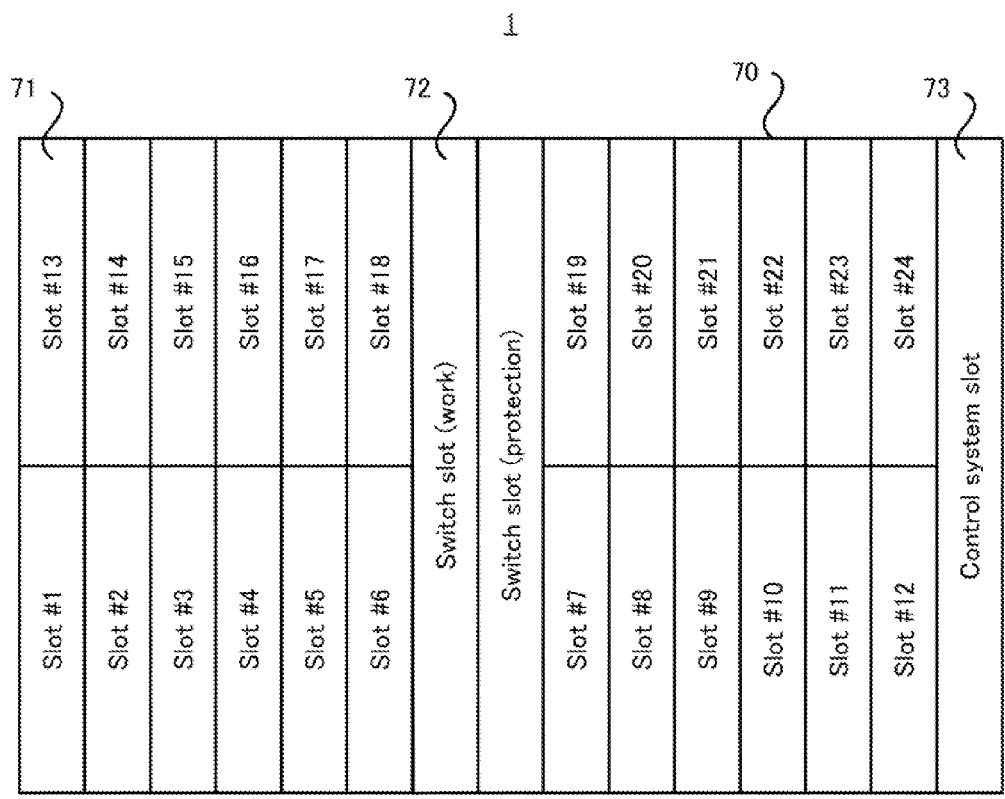
FIG. 2 is a schematic diagram illustrating the appearance of a case of the communication apparatus in the embodiment.

With reference to FIG. 1 and FIG. 2, the structure of a communication apparatus 1 in this embodiment will be explained. FIG. 1 is a block diagram illustrating one example of the structure of a communication apparatus 1 in the embodiment. FIG. 2 is a schematic diagram illustrating the appearance of a case 70 of the communication apparatus 1 in the embodiment.

As illustrated in FIG. 1, the communication apparatus 1 in the embodiment includes: a plurality of transmission plug in card units 10 (hereinafter referred to as "transmission units 10") corresponding to one example of the "signal processing unit"; a plurality of reception plug in card units 20 (hereinafter referred to as "reception units 20") corresponding to one example of the "signal processing unit"; a switch unit 30 corresponding to one example of the "signal processing unit"; an apparatus control card unit 40 (hereinafter referred to as a "control unit 40") corresponding to one example of the "control apparatus"; a temperature monitor 50 corresponding to one example of the "measuring device"; and a back wiring board 60 corresponding to one example of the "transmission line". Each of the plurality of transmission units 10 and the plurality of reception units 20 is mounted on respective one of a plurality of slots 71 (specifically, a slot #1 to a slot #24) which are included in the case 70 of the communication apparatus 1, as illustrated in FIG. 2. The switch unit 30 is mounted on a switch slot 72 which is included in the case 70 of the communication apparatus 1, as illustrated in FIG. 2. FIG. 2 illustrates an example in which a not-illustrated work transmission line (or actually-used line) and a not-illustrated protection transmission line (or standby line), which laid outside the communication apparatus 1, are connected to the communication apparatus 1 and in which the switch slot 72 for mounting the switch unit 30 for controlling the signal transmission and the signal reception with respect to the work transmission line and the switch slot 72 for mounting the switch unit 30 for controlling the signal transmission and the signal reception with respect to the protection transmission line are located. The control unit 40 is mounted on a control system slot 73 which is included in the case 70 of the communication apparatus 1, as illustrated in FIG. 2.

Each of the plurality of transmission units 10 is connected to the back wiring board 60 via a connector 61. Each of the plurality of transmission units 10 includes: a SERDES transmitter 11; a PVT (Process Voltage Temperature) information storage unit 12; an aging counter 13; and a card controller 14.

The SERDES transmitter 11 transmits a signal to the reception unit 20 and the switch unit 30 via the back wiring board 60 (e.g. via an internal data bus of the back wiring board 60). In the embodiment, the SERDES transmitter 11 includes a FFE (Feed Forward Equalizer) 15. The FFE 15 shapes the waveform of the signal transmitted from the SERDES transmitter 11. The equalizer set value for the FFE 15 may be set by the control unit 40. The FFE 15 corresponds to one example of the "waveform shaping unit".

The PVT information storage unit 12 stores PVT information indicating characteristics which is unique to the transmission unit 10. For example, the PVT information which is generated or prepared by a manufacturer or the like of the transmission unit 10 may be stored in the PVT information storage unit 12 in advance when the transmission unit 10 is manufactured. Instead of the PVT information, any information indicating the characteristics which is unique to the transmission unit 10 may be used.

Figure 3:
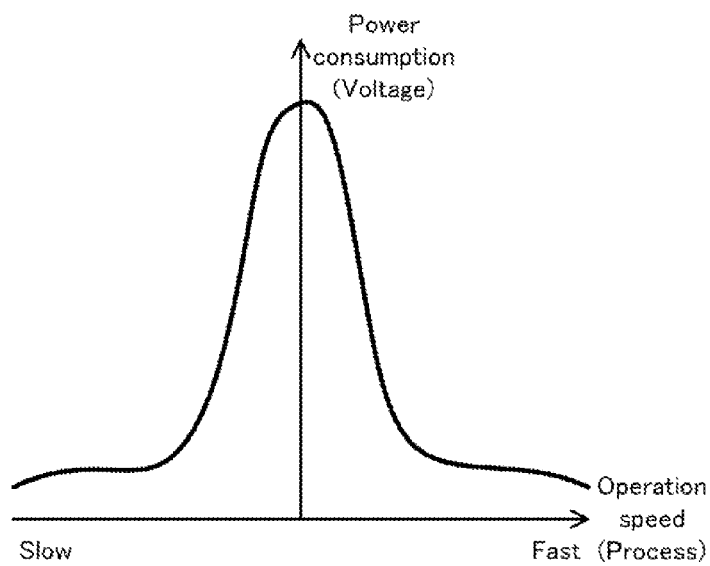
FIG. 3 is a graph illustrating one example of PTV information.

Now, with reference to FIG. 3, the PVT information will be explained. FIG. 3 is a graph illustrating one example of the PTV information. As illustrated in FIG. 3, the PVT information may be a graph, a function, or the like in which the operation speed (Process) and the power consumption (Voltage) of the transmission unit 10 (or the reception unit 20 or the switch unit 30 described later) are associated with each other. Alternatively, the PVT information may be a graph, a function, or the like in which at least two of the operation speed (Process), the power consumption (Voltage) and the operating temperature (Temperature) of the transmission unit 10 (or the reception unit 20 or the switch unit 30 described later) are associated with each other.

In FIG. 1 again, the aging counter 13 counts a counter value while the transmission unit 10 is used. In other words, the aging counter 13 may not count the counter value while the transmission unit 10 is not used. In other words, the aging counter 13 generates aging information (or a count value in the embodiment) indicating the degree of the aged deterioration of the transmission unit 10. Incidentally, the aging information is not limited to the count value, and any information which indicates the degree of the aged deterioration of the transmission unit 10 may be used as the aging information.

The card controller 14 controls the operations of the transmission unit 10. The card controller 14 can transmit various control information to the reception unit 20, the switch unit 30, and the control unit 40, via the back wiring board 60 (e.g. the internal control bus 62 of the back wiring board 60). In the embodiment, as the control information, the PTV information stored by the PVT information storage unit 12 and the aging information counted by the aging counter 13 are listed as one example. The care controller 14 generates mounting information, in synchronization with a mounting of the transmission unit 10 onto the case 70. The mounting information indicates a mounting state of the transmission unit 10. The card controller 14 transmits, as the control information, the generated mounting information to the control unit 20, the switch unit 30, and the control unit 40 via the back wiring board 60 (e.g. the internal control bus 62 of the back wiring board 60). The mounting information indicates, for example, a card type of the transmission unit 10, a slot position at which the transmission unit 10 is mounted, the card type and slot position of another unit mounted around the transmission unit 10, or the like.

Each of the plurality of the reception units 20 is connected to the back wiring board 60 via the connector 61. Each of the plurality of the reception units 20 includes: a SERDES receiver 21; a PVT information storage unit 22; an aging counter 23; and a card controller 24.

The SERDES receiver 21 receives the signal, which is transmitted from the transmission unit 10 and the switch unit 30 via the back wiring board 60 (e.g. its internal data bus). In the embodiment, the SERDES receiver 21 includes a DFE (Decision Feedback Equalizer) 25. The DFE shapes the waveform of the signal received by the SERDES receiver 21. The equalizer set value of the DFE 25 may be set by the control unit 40. The DFE 25 corresponds to one example of the "waveform shaping unit".

The PVT information storage unit 22 has the same structure as that of the PVT information storage unit 12 described above. Specifically, the PVT information storage unit 22 stores PVT information indicating characteristics which is unique to the reception unit 20.

The aging counter 23 has the same structure as that of the aging counter 13. Specifically, the aging counter 23 generates aging information (or a counter value in the embodiment) indicating the degree of the aged deterioration of the reception unit 20.

The card controller 24 has the same structure as that of the card controller 14 described above. Specifically, the card controller 24 controls the operations of the reception unit 20. The card controller 24 can transmit various control information to the transmission unit 10, the switch unit 30, and the control unit 40 via the back wiring board 60 (e.g. the internal control bus 62 of the back wiring board). As the control information, the PVT information stored by the PVT information storage unit 22, the aging information counted by the aging counter 23, and the mounting information indicating the mounting state of the reception unit 20 are listed as one example.

The switch unit 30 is connected to the back wiring board 60 via the connector 61. Moreover, the switch unit 30 includes: a plurality of SERDES transmitters 11 corresponding to the plurality of reception units 20 described above; a plurality of SERDES receivers 21 corresponding to the plurality of transmission units 10 described above; a PVT information storage unit 32; an aging counter 33; and a card controller 34.

The SERDES transmitter 11 included in the switch unit 30 has the same structure as that of the SERDES transmitter 11 included in the transmission unit 10. Moreover, the SERDES receiver 21 included in the switch unit 30 has the same structure as that of the SERDES receiver 21 included in the reception unit 20.

The PVT information storage unit 32 has the same structure as that of at least one of the PVT information storage units 12 and 22 described above. Specifically, the PVT information storage unit 32 stores PVT information indicating characteristics which is unique to the switch unit 30.

The aging counter 33 has the same structure as that of at least one of the aging counters 13 and 23 described above. Specifically, the aging counter 33 generates aging information (or a counter value in the embodiment) indicating the degree of the aged deterioration of the switch unit 30.

The card controller 34 has the same structure as that of at least one of the card controllers 14 and 24 described above. Specifically, the card controller 34 controls the operations of the switch unit 30. The card controller 34 can transmit various control information to the transmission unit 10, the reception unit 20, and the control unit 40 via the back wiring board 60 (e.g. the internal control bus 62 of the back wiring board 60). As the control information, the PVT information stored by the PVT information storage unit 32, the aging information counted by the aging counter 33, and the mounting information indicating the mounting state of the switch unit 30 are listed as one example.

The control unit 40 includes: an apparatus controller 41; and a set value calculation database 42. The apparatus controller 41 controls the operations of the communication apparatus 1. In the embodiment, the apparatus controller 41 calculates the equalizer set value for the FFE 15 included in the SERDES transmitter 11 and the equalizer set value for the DFE 25 included in the SERDES receiver 21. The set value calculation database 42 stores various databases. The various databases are used for an operation of calculating the equalizer set value (and further, an operation of calculating device temperatures of the transmission unit 10, the reception unit 20 and the switch unit 30 described later) performed by the apparatus controller 41.

Figure 4:
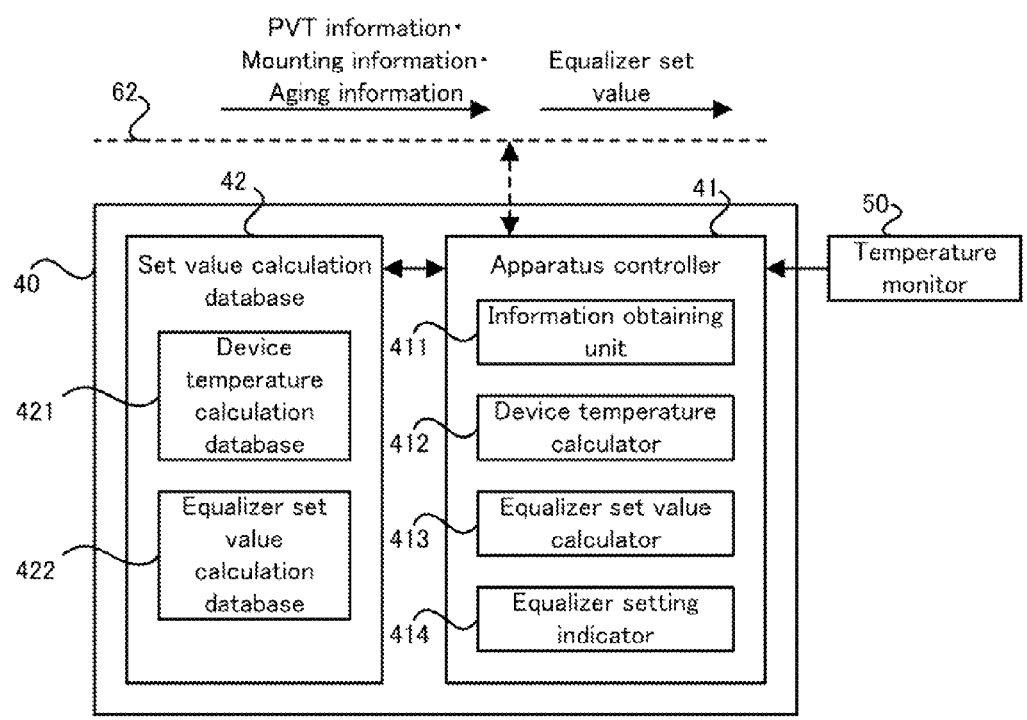
FIG. 4 is a block diagram illustrating one example of the structure of an apparatus control card unit included in the communication apparatus in the embodiment.

Now, with reference to FIG. 4, the structure of the control unit 40 will be explained in more detail. FIG. 4 is a block diagram illustrating one example of the structure of the control unit 40 included in the communication apparatus 1 in the embodiment.

As illustrated in FIG. 4, the apparatus controller 41 of the control unit 40 includes: an information obtaining unit 411 corresponding to one example of the "obtaining device"; a device temperature calculator 412 corresponding to one example of the "obtaining device"; an equalizer set value calculator 413 corresponding to one example of the "adjusting device"; and an equalizer setting indicator 414 corresponding to the "adjusting device". The set value calculation database 42 includes: a device temperature calculation database 421; and an equalizer set value calculation database 422.

The information obtaining unit 411 obtains the control information (i.e. the PVT information, the aging information, the mounting information, or the like) transmitted from the transmission unit 10, the reception unit 20 or the switch unit 30.

The device temperature calculator 412 calculates a device temperature indicating the temperature of at least one of the transmission unit 10, the reception unit 20 and the switch unit 30, on the basis of the control information (e.g. the PVT information and the mounting information) obtained by the information obtaining unit 411 and an environmental temperature measured by the temperature monitor 50. The device temperature indicates, for example, the individual temperature (or individual operation temperature) of the transmission unit 10, the reception unit 20 or the switch unit 30.

The equalizer set value calculator 413 calculates the equalizer set value for the FFE 15 included in the SERDES transmitter 11 of the transmission unit 10 or the switch unit 30, on the basis of the control information (e.g. the PVT informant and the aging information) obtained by the information obtaining unit 411 and the device temperature calculated by the device temperature calculator 412. In addition to or instead of the above calculation, the equalizer set value calculator 413 calculates the equalizer set value for the DFE 25 included in the SERDES receiver 21 of the reception unit 20 or the switch unit 30, on the basis of the control information (e.g. the PVT informant and the aging information) obtained by the information obtaining unit 411 and the device temperature calculated by the device temperature calculator 412.

The equalizer setting indicator 414 transmits a control signal for give notice of the equalizer set values and for applying those values to the FFE 15 and the DFE 25 such that the FFE 15 and the DFE 25 operate with the equalizer set values calculated by the equalizer set value calculator 413.

The device temperature calculation database 421 includes a database indicating a correspondence between the device temperature and at least one of the control information (e.g. the PVT information and the mounting information) obtained by the information obtaining unit 411 and the environmental temperature measured by the temperature monitor 50. The device temperature calculation database 421 will be detailed later by using the drawing (refer to FIG. 6).

The equalizer set value calculation database 422 includes a database indicating a correspondence between the equalizer set value and at least one of the control information (e.g. the PVT information and the aging information) obtained by the information obtaining unit 411 and the device temperature calculated by the device temperature calculator 412. The equalizer set value calculation database 422 will be detailed later by using the drawing (refer to FIG. 7).

In FIG. 1 again, the temperature monitor 50 measures the environmental temperature of the communication apparatus 1. The environmental temperature indicates, for example, the temperature of any point within the case 70 of the communication apparatus 1 or the temperature around the communication apparatus 1.

(2) Process Examples of Communication Apparatus

Figure 5:
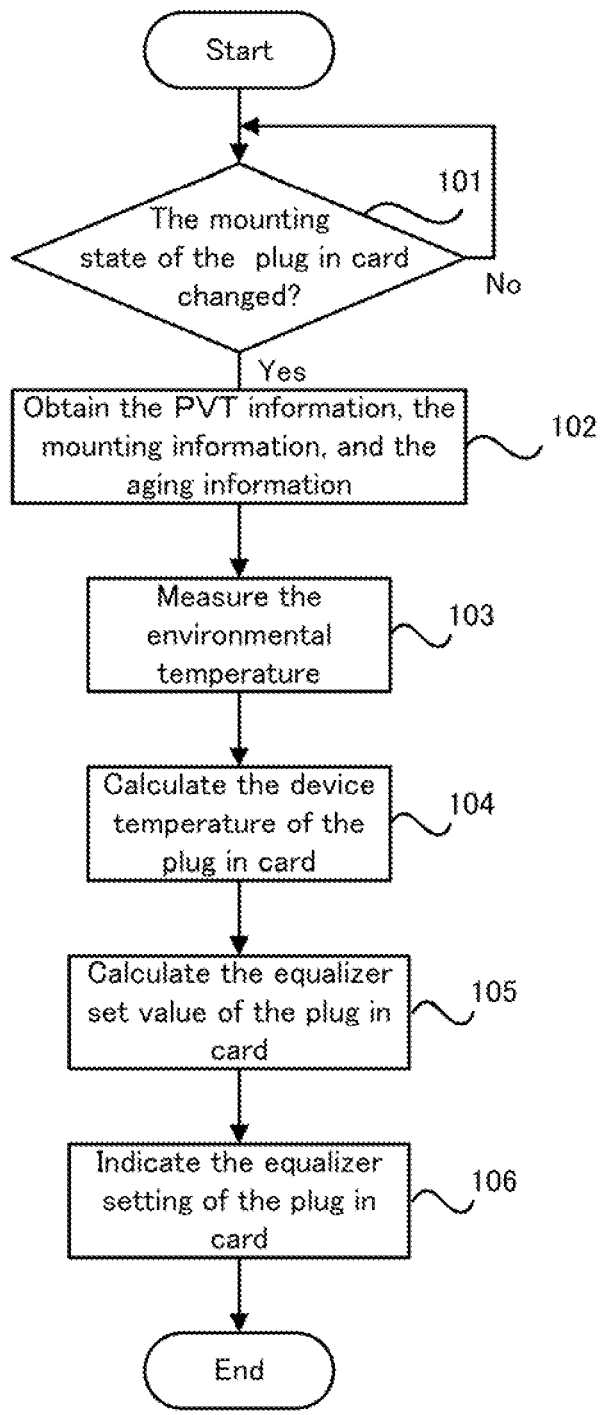
FIG. 5 is a flowchart illustrating a flow of processes of the communication apparatus in the embodiment.

With reference to FIG. 5, an explanation will be given on a flow of processes of the communication apparatus 1 in the embodiment. FIG. 5 is a flowchart illustrating a flow of the process of the communication apparatus 1 in the embodiment.

As illustrated in FIG. 5, the information obtaining unit 411 included in the control unit 40 judges whether or not the mounting state of the transmission unit 10, the reception unit 20 or the switch unit 30 has been changed (step S101). For example, when the transmission unit 10, the reception unit 20 or the switch unit 30 is newly mounted on the case 70, the mounting information may be transmitted to the control unit 40 from the newly mounted transmission unit 10, reception unit 20 or switch unit 30. Therefore, when receiving the transmission of the mounting state, the information obtaining unit 411 may judge that the mounting state of the transmission unit 10, the reception unit 20 or the switch unit 30 has been changed.

As a result of the judgment in the step S101, if it is judged that the mounting state of the transmission unit 10, the reception unit 20 or the switch unit 30 has not been changed (the step S101: No), the information obtaining unit 411 continues the process in the step S101.

As a result of the judgment in the step S101, if it is judged that the mounting state of the transmission unit 10, the reception unit 20 or the switch unit 30 has been changed (the step S101: Yes), the information obtaining unit 411 obtains the PVT information, the aging information, and the mounting information from the transmission unit 10, the reception unit 20 or the switch unit 30 whose mounting state has been changed (step S102). Moreover, the information obtaining unit 411 may obtain the PVT information, the aging information, and the mounting information again from the transmission unit 10, the reception unit 20 or the switch unit 30 whose mounting state has not been changed. The information obtaining unit 411 outputs the obtained PVT information, the obtained aging information, and the obtained mounting information, to the device temperature calculator 412.

Then, the temperature monitor 50 measures the environmental temperature of the communication apparatus 1 (step S103). The temperature monitor 50 may always measure the environmental temperature in addition to or instead of the measurement of the environmental temperature in particular timing. The temperature monitor 50 outputs the measured environmental temperature to the device temperature calculator 412.

Then, the device temperature calculator 412 calculates the device temperature of the transmission unit 10, the reception unit 20 or the switch unit 30 (step S104). Considering that it is preferable to calculate the equalizer set values of both the transmission side (i.e. the FFE 15 side) and the reception side (i.e. the DFE 25 side) for the proper communication, the device temperature calculator 412 may calculate the device temperature of each of the unit (the transmission unit 10, the reception unit 20 or the switch unit 30) whose mounting state has been changed and another unit (the transmission unit 10, the reception unit 20 or the switch unit 30) opposed to the unit whose mounting state has been changed. Alternatively, the device temperature calculator 412 may calculate the device temperature of each of at least two units (the transmission unit 10, the reception unit 20 or the switch unit 30) including the FFE 15 and the DFE 25 whose equalizer set value is desired to be changed, out of all the transmission units 10, the reception units 20 and the switch unit 30 included in the communication apparatus 1. Alternatively, the device temperature calculator 412 may calculate the device temperature of each of all the transmission units 10, the reception units 20 and the switch unit 30 included in the communication apparatus 1. The device temperature calculator 412 outputs the calculated device temperature to the equalizer set value calculator 413.

Figure 6:
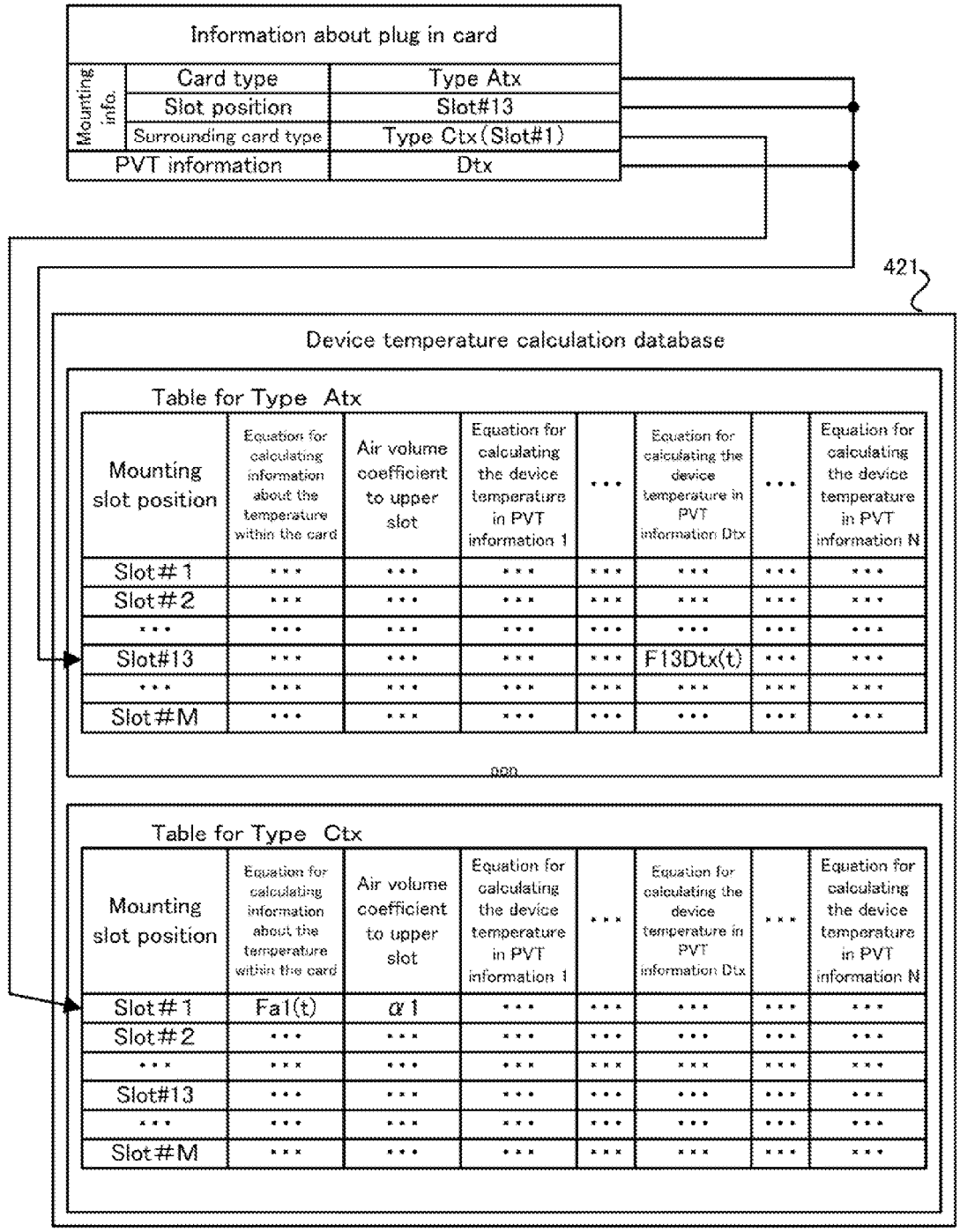
FIG. 6 is an explanatory view illustrating a method of calculating a device temperature in association with a device temperature calculation database.

Now, with reference to FIG. 6, the method of calculating the device temperature will be explained in more detail. FIG. 6 is an explanatory view illustrating the method of calculating the device temperature in association with the device temperature calculation database 421. Incidentally, FIG. 6 explains the example in which the device temperature of the transmission unit 10 is calculated; however, the same device temperature calculation database can be used even when the device temperatures of the reception unit 20 and the switch unit 30 are calculated.

As illustrated in FIG. 6, the device temperature calculation database 421 illustrates equations for calculating the device temperature which is uniquely determined by specifying both the slot positions and the PVT information indicated by the mounting information, for each card type of the transmission unit 10. For example, in the example illustrated in FIG. 6, the device temperature calculation database 421 illustrates the equations for calculating the device temperature which is uniquely determined by specifying both the slot position indicated by any one of "#1" to "#M" and the PVT information indicated by any one of "1" to "N". More specifically, in the example illustrated in FIG. 6, it is exemplified that the equation for calculating the device temperature is "F13Dtx(t)", when the card type is "Type Atx", the slot position indicated by the mounting information is "slot #13", and the PVT information is "Dtx".

The device temperature calculation database 421 illustrates a correspondence between the slot positions indicated by the mounting information and equations for calculating information about the temperature within the card, wherein each of the equations indicates a temperature increase value within the case with respect to the intake temperature of the transmission unit 10, for each card type of the transmission unit 10. In addition, the device temperature calculation database 421 illustrates a correspondence between the slot positions indicated by the mounting information and air volume coefficients to the upper slot, wherein each of the air volume coefficients indicates an air volume given to the upper slot, for each card type of the transmission unit 10. For example, in the example illustrated in FIG. 6, the device temperature calculation database 421 illustrates equations for calculating information about the temperature within the card and the air volume coefficients to the upper slot, wherein each of the equations corresponds to respective one of the slot positions indicated by "#1" to "#M". More specifically, in the example illustrated in FIG. 6, it is exemplified that the equation for calculating information about the temperature within the card is "Fa1(t)" and the air volume coefficient to the upper slot is "α1", when the card type is "Type Ctx" and the slot position indicated by the mounting information is "slot#1".

A specific explanation will be given on the operation of calculating the device temperature when the PVT information and the mounting information illustrated in the uppermost part of FIG. 6 are obtained. The mounting information indicates (i) that the transmission unit 10 with a card type of "Type Atx" is mounted on the "slot #13" and (ii) that the transmission unit 10 with a card type of "Type Ctx" is mounted around the transmission unit 10 with a card type of "Type Atx" (e.g. the slot #1 located below the slot #13: refer to FIG. 2). Moreover, the PVT information indicates that the transmission unit 10 with a card type of "Type Atx" has the PTV information "Dtx".

The device temperature calculator 412 refers to a table for "Type Atx" in the device temperature calculation database 421, on the basis of the card type "Type Atx" indicated by the mounting information. Moreover, the device temperature calculator 412 obtains the equation for calculating the device temperature "F13Dtx(t)" associated with the "slot #13" indicated by the mounting information and the "Dtx" indicated by the PVT information, from the table for "Type Atx", on the basis of the "slot #13" indicated by the mounting information and the "Dtx" indicated by the PVT information.

Moreover, the device temperature calculator 412 obtains the equation for calculating the information about the temperature within the card "Fa1(t)" and the air volume coefficient to the upper slot "α1" associated with the "slot #1" indicated by the mounting information, from a table for "Type Ctx" in the device temperature calculation database 421, on the basis of a surrounding card type "Type Ctx (slot #1)" indicated by the mounting information.

Moreover, the device temperature calculator 412 further obtains an environmental temperature "T" measured by the temperature monitor 50.

Then, the device temperature calculator 412 calculates a numerical value obtained by substituting the equation for calculating the information about the temperature within the card "Fa1(t)", the air volume coefficient to the upper slot "α1", and the environmental temperature as variables, into the equation for calculating the device temperature "F13Dtx(t)". The obtained numerical value corresponds to the device temperature. Specifically, the device temperature calculator 412 calculates a numerical value obtained by calculating an equation of F13Dtx(α1×(T+Fa1(T)), as the device temperature of the transmission unit 10 with a card type of "Type Atx".

In FIG. 5 again, the equalizer set value calculator 413 calculates the equalizer set value of the FFE 15 or the DFE 25 included in the transmission unit 10, the reception unit 20 or the switch unit 30 (step S105). Considering that it is preferable to calculate the equalizer set values of both the transmission side (i.e. the FFE 15 side) and the reception side (i.e. the DFE 25 side) for the proper communication, the equalizer set value calculator 413 may calculate the equalizer set value of each of the FFE 15 and the DFE 25 included in the unit (the transmission unit 10, the reception unit 20 or the switch unit 30) whose mounting state has been changed and another unit (the transmission unit 10, the reception unit 20 or the switch unit 30) opposed to the unit whose mounting state has been changed. Alternatively, the equalizer set value calculator 413 may calculate the equalizer set value of each of a pair of the FFE 15 and the DFE 25 whose equalizer set values are desired to be changed, out of the FFEs 15 and the DFEs 25 included in all the transmission units 10, the reception units 20 and the switch unit 30 of the communication apparatus 1. The equalizer set value calculator 413 outputs the calculated equalizer set value to the equalizer setting indicator 414.

Figure 7:
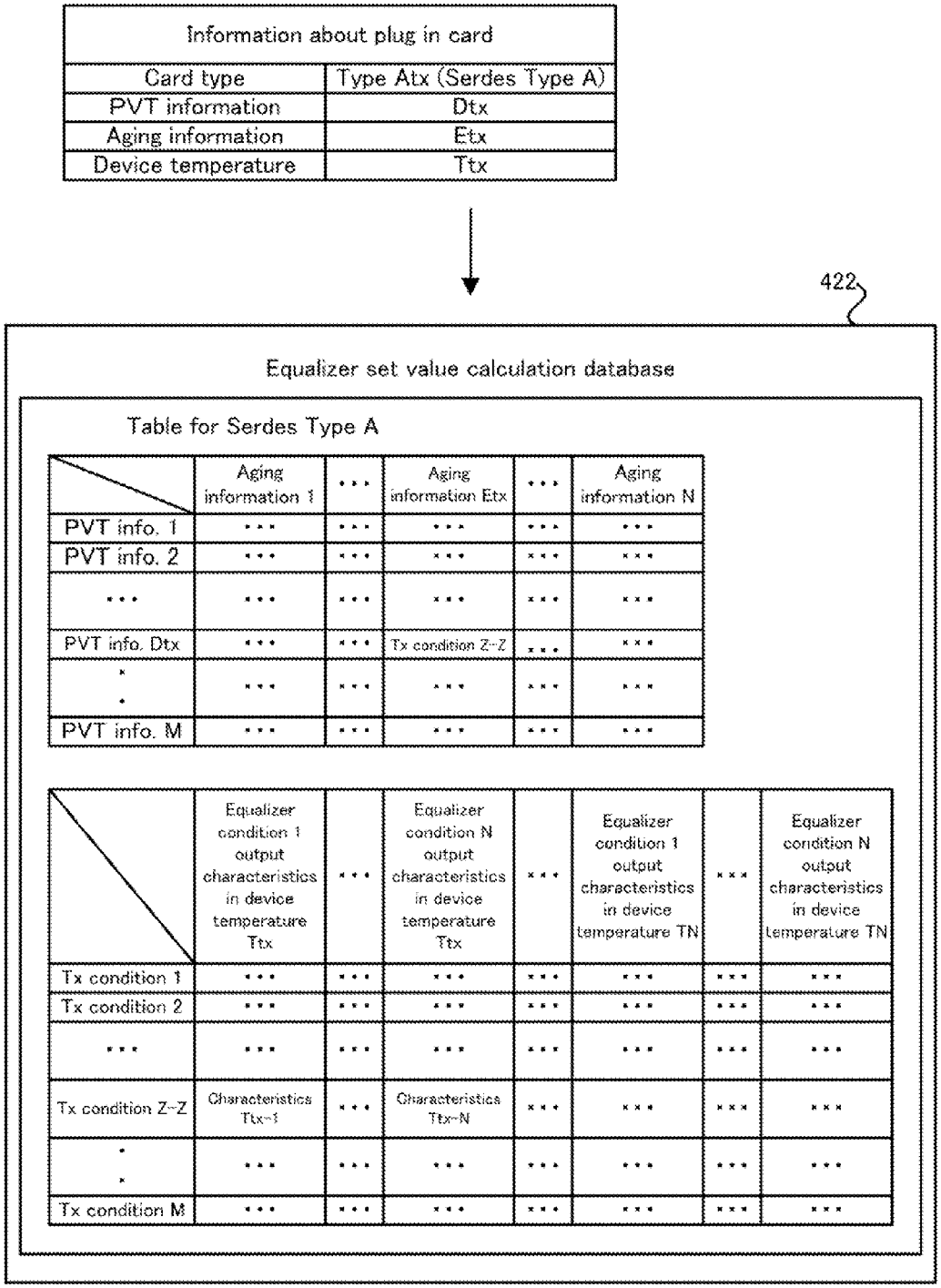
FIG. 7 is an explanatory view illustrating a method of calculating an equalizer set value in association with an equalizer set value calculation database.

Now, with reference to FIG. 7, the method of calculating the equalizer set value will be explained in more detail. FIG. 7 is an explanatory view illustrating the method of calculating the equalizer set value in association with the equalizer set value calculation database 422. Incidentally, FIG. 7 explains the equalizer set value calculation database 422 corresponding to the transmission unit 10; however, the same equalizer set value calculation database can be used for the reception unit 20 and the switch unit 30.

As illustrated in FIG. 7, the equalizer set value calculation database 422 illustrates Tx conditions which are uniquely determined by specifying both the PVT information and the aging information, for each card type of the transmission unit 10 (i.e. type of the SERDES transmitter 11). For example, in the example illustrated in FIG. 7, the equalizer set value calculation database 422 illustrates the Tx conditions which are uniquely determined by specifying both the PVT information indicated by "#1" to "#M" and the aging information indicated by "1" to "N". More specifically, in the example illustrated in FIG. 7, it is exemplified that a Tx condition Z-Z is specified when the PVT information is "Dtx" and the aging information is "Etx".

In addition, as illustrated in FIG. 7, the equalizer set value calculation database 422 illustrates a plurality of transmission-side output characteristics which are determined by specifying both the Tx conditions and the device temperatures, for each card type of the transmission unit 10 (i.e. type of the SERDES transmitter 11). Each of the plurality of transmission-side output characteristics is associated with respective one of predetermined equalizer set values (equalizer conditions). For example, in the example illustrates in FIG. 7, the equalizer set value calculation database 422 illustrates the plurality of transmission-side output characteristics which are determined by specifying both the Tx conditions indicated by a "Tx condition 1" to a "Tx condition M" and the device temperatures indicated by "Ttx" to "TN". In addition, in the example illustrates in FIG. 7, the equalizer set value calculation database 422 illustrates that each of the plurality of transmission-side output characteristics is associated with respective one of predetermined equalizer set values "1" to "N" (equalizer conditions). More specifically, in the example illustrated in FIG. 7, it is exemplified that "transmission-side output characteristics Ttx-1" to "transmission-side output characteristics Ttx-N" associated with the equalizer set values "1" to "N" are specified when the Tx condition is "Z-Z" and the device temperature is "Ttx".

A specific explanation will be given on the operation of calculating the equalizer set value when the PVT information, the mounting information, the aging information and the device temperature illustrated in the uppermost part of FIG. 7 are obtained. The mounting information indicates that the transmission unit 10 with a card type of "Type Atx" (in other words, the SERDES transmitter 11 with a type of "Type A") is mounted. The PVT information indicates that the PVT information of the transmission unit 10 is "Dtx". The aging information indicates that the aging information of the transmission unit 10 is "Etx". The device temperature indicates that the device temperature of the transmission unit 10 is "Ttx".

The equalizer set value calculator 413 refers to a table for "Type Atx" in the equalizer set value database 422 (in other words, a table for "SERDES Type A"), on the basis of the card type "Type Atx" indicated by the mounting information. Moreover, the equalizer set value calculator 413 obtains the "Tx condition Z-Z" associated with the "Dtx" indicated by the PVT information and the "Etx" indicated by the aging information, from the table for "Type A", on the basis of the "Dtx" indicated by the PVT information and the "Etx" indicated by the aging information.

Then, the equalizer set value calculator 413 obtains the "transmission-side output characteristics Ttx-1" to the "transmission-side output characteristics Ttx-N" which are associated with both of the "Tx condition Z-Z" indicated by the Tx condition and the "Ttx" indicated by the device temperature and which are associated with the equalizer set values "1" to "N" of the FFE 15, from the table for "Type A", on the basis of the "Tx condition Z-Z" indicated by the obtained Tx condition and the "Ttx" indicated by the device temperature.

By using the same method, reception-side output characteristics corresponding to the reception unit 20 are also obtained. Hereinafter, an explanation will be given under the assumption that "reception-side output characteristics Rtx-1" to "reception-side output characteristics Rtx-N", which are associated with the equalizer set values "1" to "N" of the DFE 25, are obtained as the output characteristics corresponding to the reception unit 20 opposed to the transmission unit 10 for which the "transmission-side output characteristics Ttx-1" to "transmission-side output characteristics Ttx-N" are obtained.

Then, the equalizer set value calculator 413 calculates a combination of the equalizer ser values which satisfy a condition expression of "S (transmission-side output characteristics)≥reception-side output characteristics" by using an S parameter (i.e. S(x)) which indicates line characteristics in the back wiring board 60. The S parameter indicating the line characteristics may be obtained in advance by the information obtaining unit 411 or may be obtained when the equalizer set value is actually calculated. By this, the equalizer set value calculator 413 can calculate both the equalizer set value of the FFE 15 and the equalizer set value of the DFE 25.

In FIG. 5 again, the equalizer setting indicator 414 transmits a control signal for indicating the equalizer set values to the FFE 15 and the DFE 25 which are targets for the control signal, such that the FFE 15 and the DFE 25 operate with the equalizer set values calculated in the step S105 (step S106). As a result, the FFE 15 and the DFE 25 operate while realizing waveform shaping characteristics according to the new equalizer set value. In other words, the FFE 15 and the DFE 25 operate by applying the change of the equalizer set value. Incidentally, if the equalizer set value newly set in the step S105 is equal to the current equalizer set value of the FFE 15 or the DFE 25, the equalizer setting indicator 414 does not have to transmit the control signal for indicating the newly calculated equalizer set value, to the FFE 15 and the DFE 25.

As explained above, according to the communication apparatus 1 in the embodiment, the control unit 40 can calculate the equalizer set values of the FFE 15 and the DFE 25, on the basis of the mounting information, the PVT information and the aging information obtained from the transmission unit 10, the reception unit 20 or the switch unit 30, and the environmental temperature obtained from the temperature monitor 50. Therefore, the control unit 40 can properly adjust the waveform shaping characteristics of the FFE 15 and the DFE 25 in accordance with the change of using environment of the communication apparatus 1 (e.g. the change of the mounting state of the transmission unit 10, the reception unit 20 or the switch unit 30, the change of the device temperature, the PVT information which can influence those changes, or the like).

According to the communication apparatus 1 in the embodiment, the control unit 40 can properly adjust the waveform shaping characteristics of the FFE 15 and the DFE 25 without actually monitoring various signals which are transmitted within the communication apparatus 1. Therefore, the control unit 40 can properly adjust the waveform shaping characteristics of the FFE 15 and the DFE 25 without significantly increasing a processing load.

According to the communication apparatus 1 in the embodiment, the control unit 40 can calculate the device temperature of the transmission unit 10, the reception unit 20 or the switch unit 30, on the basis of the mounting information and the PVT information obtained from the transmission unit 10, the reception unit 20 or the switch unit 30, and the environmental temperature obtained from the temperature monitor 50. Therefore, the control unit 40 can properly calculate the device temperature of the transmission unit 10, the reception unit 20 or the switch unit 30 in view of the mounting state and characteristics or the like of the transmission unit 10, the reception unit 20 or the switch unit 30, without directly monitoring the device temperatures of all the transmission units 10, the reception units 20, and the switch unit 30 included in the communication apparatus 1. Therefore, the control unit 40 can properly calculate the device temperatures of the transmission unit 10, the reception unit 20 and the switch unit 30.

According to the communication apparatus 1 in the embodiment, the control unit 40 can calculate the device temperature of the transmission unit 10, the reception unit 20 or the switch unit 30, by adding or subtracting the temperature fluctuation, which is due to the mounting state and the characteristics or the like of the transmission unit 10, the reception unit 20 or the switch unit 30, with respect to the environmental temperature. Therefore, the control unit 40 can properly calculate the device temperatures of the transmission unit 10, the reception unit 20 and the switch unit 30.

According to the communication apparatus 1 in the embodiment, the control unit 40 can calculate the equalizer set value in view of the degree of the aged deterioration (i.e. the aging information) of the transmission unit 10, the reception unit 20 and the switch unit 30. Thus, the control unit 40 can calculate the more proper equalizer set value.

According to the communication apparatus 1 in the embodiment, the control unit 40 can calculate the equalizer set value in view of the line characteristics (e.g. the S parameter or the like) of the back wiring board 60. Thus, the control unit 40 can calculate the more proper equalizer set value.

According to the communication apparatus 1 in the embodiment, the PVT information is stored in advance in the transmission unit 10, the reception unit 20 and the switch unit 30. Thus, the control unit 40 can properly obtain the PVT information of the transmission unit 10, the reception unit 20 and the switch unit 30.

According to the communication apparatus 1 in the embodiment, it is possible to calculate the device temperature and the equalizer set value by using the set value calculation database 42. Thus, considering that the set value calculation database 42 can be easily modified, the structure in the embodiment can be easily applied to a plurality types of communication apparatuses 1 having different designs or specifications.

(3) Modified Examples

Figure 8:
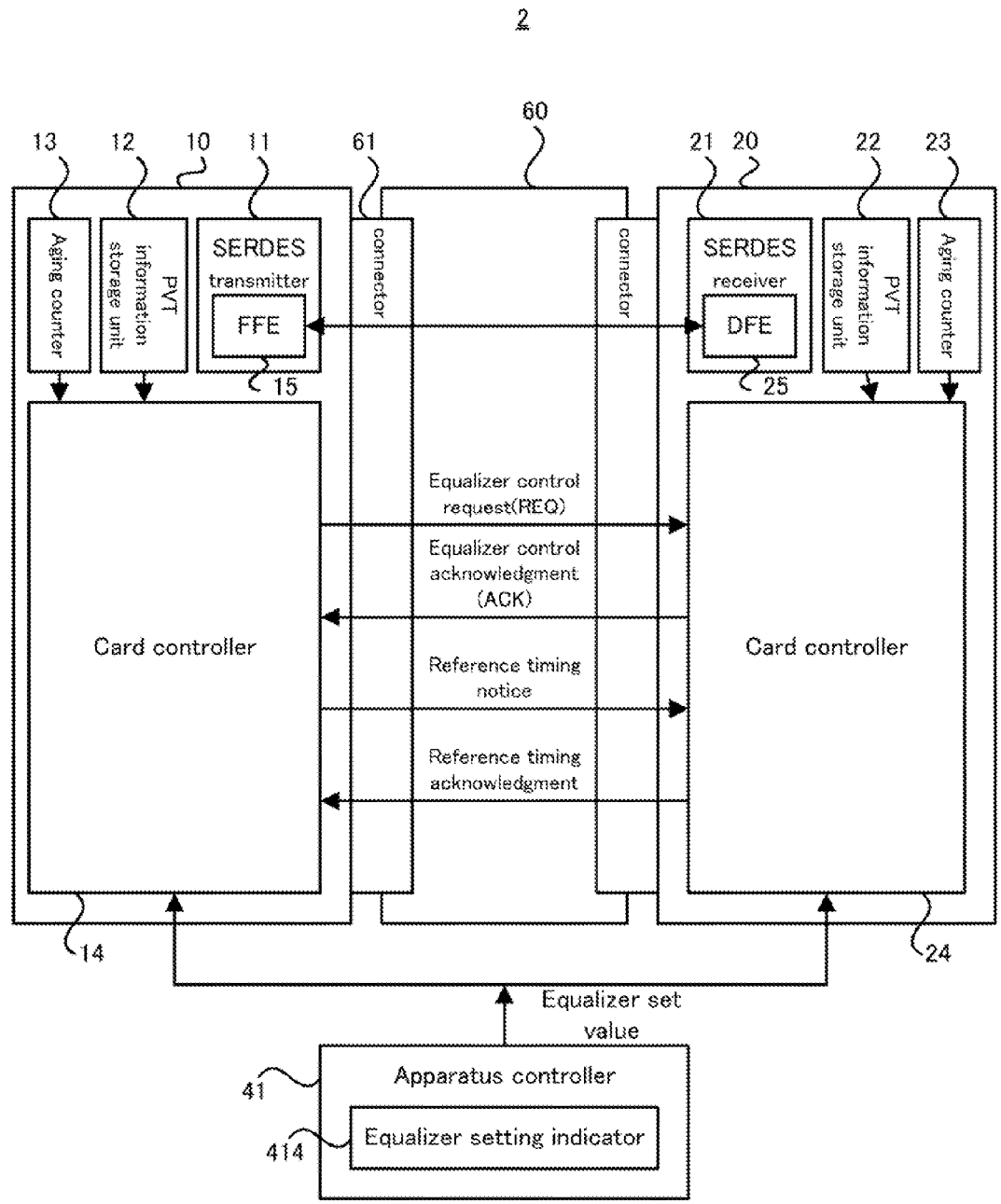
FIG. 8 is a block diagram illustrating one portion of the structure of a communication apparatus in a first modified example.
Figure 9:
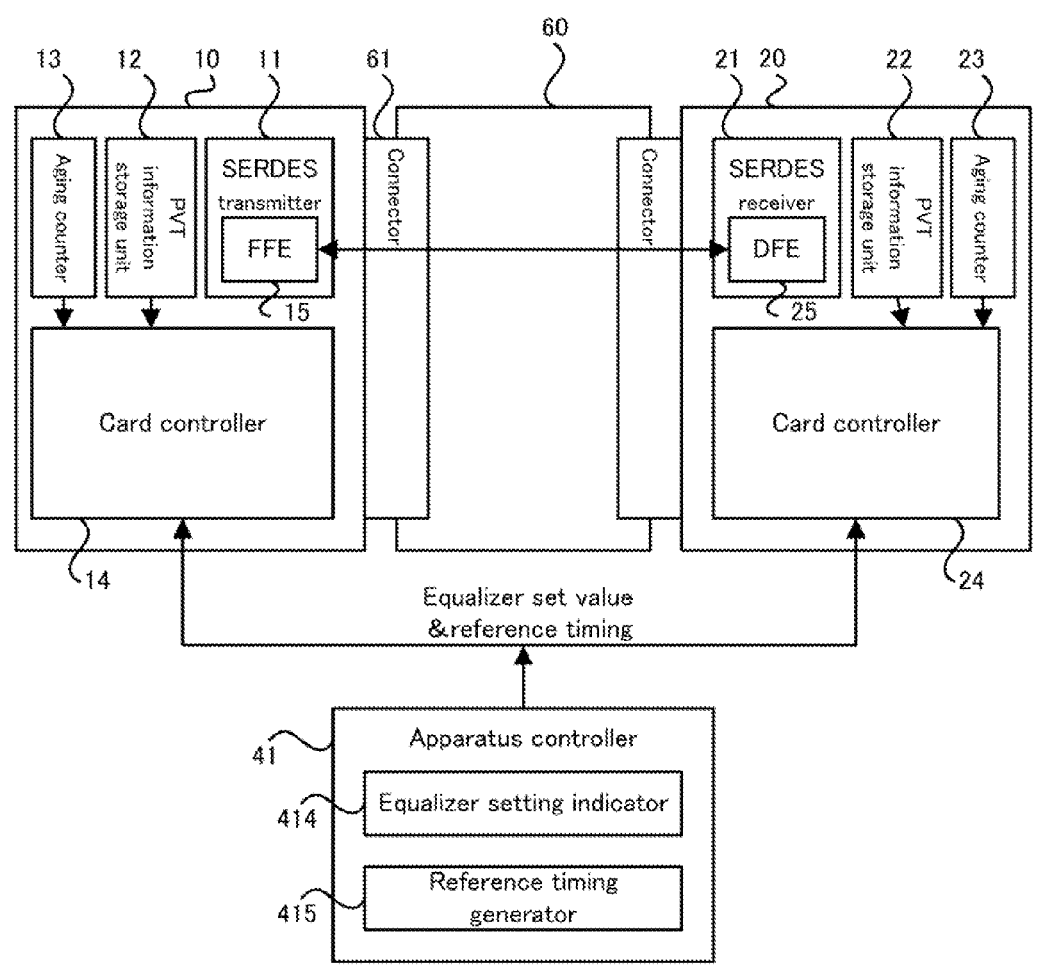
FIG. 9 is a block diagram illustrating one portion of the structure of a communication apparatus in a second modified example.
Figure 10:
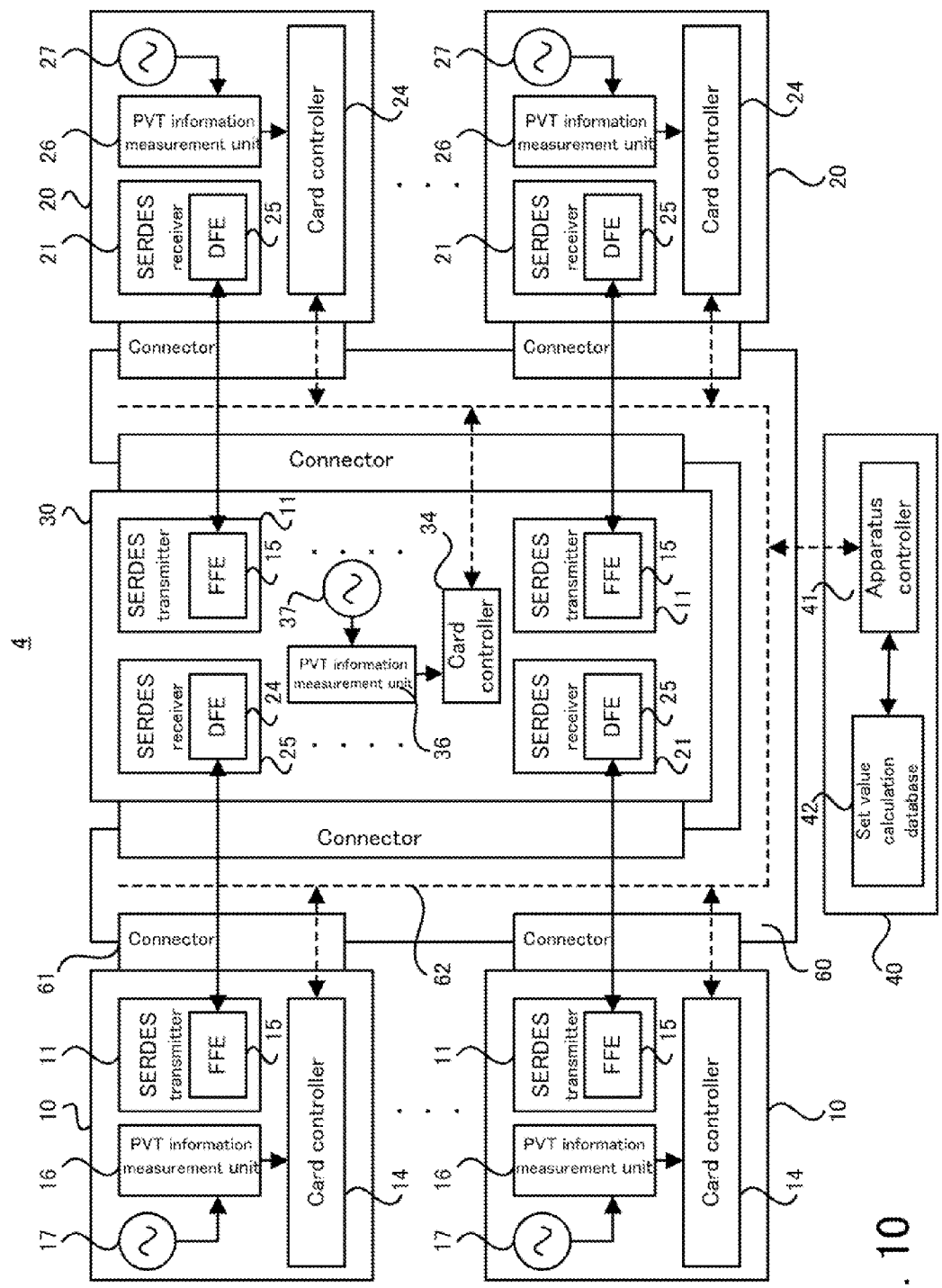
FIG. 10 is a block diagram illustrating one portion of the structure of a communication apparatus in a third modified example.

With reference to FIG. 8 to FIG. 10, the modified examples of the communication apparatus 1 in the embodiment will be explained.

(3-1) First Modified Example

With reference to FIG. 8, a first modified example of the communication apparatus 1 in the embodiment will be explained. FIG. 8 is a block diagram illustrating one portion of the structure of a communication apparatus 2 in the first modified example. In FIG. 8, for simplification or clarification of explanation, a pair of the transmission unit and the reception unit 20 will be focused on and explained.

As illustrated in FIG. 8, the communication apparatus 2 in the first modified example is different from the aforementioned communication apparatus 1 in that the card controllers 14 and 24 synchronize timing to apply the change of the equalizer set value, with each other. Specifically, in the communication apparatus 2 in the first modified example, any one of the card controller 14 included in the transmission unit 10 and the card controller 24 included in the reception unit 20 opposed to the transmission unit 10 is a master and synchronizes the timing to change the equalizer set value. The first modified example explains an example in which the card controller 14 included in the transmission unit 10 is a master.

If receiving the control signal for indicating the equalizer set value from the equalizer setting indicator 414, the card controller 14 transmits an "equalizer control request (REQ)" message for requesting the change of the equalizer set value, to the card controller 24.

If receiving the control signal for indicating the equalizer set value from the equalizer setting indicator 414 and if receiving the "equalizer control request (REQ)" message from the card controller 14, the card controller 24 returns an "equalizer control acknowledgment (ACK)" message for indicating that the request for the change of the equalizer set value is acknowledged, to the card controller 14.

If receiving the "equalizer control acknowledgment (ACK)" message from the card controller 24, the card controller 14 returns a "reference timing notice" message for indicating reference timing to change the equalizer set value, to the card controller 24.

If receiving the "reference timing notice" message from the card controller 14, the card controller 24 returns a "reference timing acknowledgment" message for indicating the reference timing is acknowledged, to the card controller 14.

Then, on both the transmission unit 10 and the reception unit 20 opposed to the transmission unit 10, the change of the equalizer set value is applied in the timing indicated by the reference timing.

According to the communication apparatus 2 in the first modified example, it is possible to receive the same various effects as those received by the communication apparatus 1 described above. According to the communication apparatus 2 in the first modified example, it is possible to match the applied timing to change the equalizer set value on the FFE 15 included in the transmission unit 10 and the applied timing to change the equalizer set value on the FFE 25 included in the reception unit 20 opposed to the transmission unit 10. Therefore, it is possible to preferably prevent the deterioration of transmission characteristics due to off-timing (or timing shift) between the applied timing to change the equalizer set value on the FFE 15 and the applied timing to change the equalizer set value on the FFE 25.

(3-2) Second Modified Example

With reference to FIG. 9, a second modified example of the communication apparatus 1 in the embodiment will be explained. FIG. 9 is a block diagram illustrating one portion of the structure of a communication apparatus 3 in the second modified example. In FIG. 9, for simplification or clarification of explanation, a pair of the transmission unit 10 and the reception unit 20 will be focused on and explained.

As illustrated in FIG. 9, the communication apparatus 3 in the second modified example is different from the aforementioned communication apparatus 1 in that the apparatus controller 41 further includes a reference timing generator 415 which generates the reference timing for indicating the timing to apply the change of the equalizer set value and which notifies the card controllers 14 and 24 of the generated reference timing. Moreover, the communication apparatus 3 in the second modified example is different from the aforementioned communication apparatus 1 in that the card controllers 14 and 24 apply the change of the equalizer set value in synchronization with the reference timing notice of which is given from the reference timing generator 415.

According to the communication apparatus 3 in the second modified example, it is possible to receive the same various effects as those received by the communication apparatus 1 described above. According to the communication apparatus 3 in the second modified example, it is possible to match the applied timing to change the equalizer set value on the FFE 15 included in the transmission unit 10 and the applied timing to change the equalizer set value on the FFE 25 included in the reception unit 20 opposed to the transmission unit 10. Therefore, it is possible to preferably prevent the deterioration of the transmission characteristics due to the off-timing (timing shift) between the applied timing to change the equalizer set value on the FFE 15 and the applied timing to change the equalizer set value on the FFE 25.

(3-3) Third Modified Example

With reference to FIG. 10, a third modified example of the communication apparatus 1 in the embodiment will be explained. FIG. 10 is a block diagram illustrating one portion of the structure of a communication apparatus 4 in the third modified example.

As illustrated in FIG. 10, the communication apparatus 4 in the third modified example is different from the aforementioned communication apparatus 1 in (i) that the transmission unit 10 includes a PVT information measurement unit 16 and a measurement reference clock supplier 17 instead of the PVT information storage unit 12 and the aging counter 13, (ii) that the reception unit 20 includes a PVT information measurement unit 26 and a measurement reference clock supplier 27 instead of the PVT information storage unit 22 and the aging counter 23, (iii) that the switch unit 30 includes a PVT information measurement unit 36 and a measurement reference clock supplier 37 instead of the PVT information storage unit 32 and the aging counter 33, and (iv) that the communication apparatus 4 does not include the temperature monitor 50.

The measurement reference clock supplier 17 outputs a clock signal with a predetermined period to the PVT information measurement unit 16. More specifically, the PVT information measurement unit 16 regularly or periodically measures a time (or propagation delay time) until a signal inputted to a not-illustrated signal circuit within the transmission unit 10 is outputted, by using the clock signal supplied from the measurement reference clock supplier 17. As a result, the PVT information measurement unit 16 can measure the characteristics which is unique to the transmission unit 10 and can generate the PVT information indicting the measured unique information. The PVT information measurement unit 16 transmits the generated PVT information to the control unit 40. Incidentally, the same process is performed even on the PVT information measurement unit 26 and the measurement reference clock supplier 27, and the PVT information measurement unit 36 and the measurement reference clock supplier 37.

The control unit 40 calculates the equalizer set value of the FFE 15 or the DFE 25 included in the transmission unit 10, the reception unit 20 or the switch unit 30, on the basis of the PVT information obtained from the PVT information measurement units 16, 26, and 36. Thus, in the third modified example, the equalizer set value calculation database 422 preferably includes a table which illustrates a correspondence between the PVT information and the equalizer set value.

According to the communication apparatus 4 in the third modified example, it is possible to receive the same various effects as those received by the communication apparatus 1 described above. According to the communication apparatus 4 in the third modified example, the transmission unit 10, the reception unit 20 and the switch unit 30 can generate the PVT information. Considering that the propagation delay time within the transmission unit 10, the reception unit 20 and the switch unit 30 changes depending on the using environment (e.g. temperature, an aged deterioration state, an applied power voltage, or the like) of the transmission unit 10, the reception unit 20 and the switch unit 30, the generated PVT information is the PVT information in which the change of the using environment is considered. Thus, the control unit 40 can calculate the equalizer set value of the FFE 15 or the DFE 25 without calculating the device temperature of the transmission unit 10, the reception unit 20 or the switch unit 30 (in other words, without calculating the device temperature with the measurement of the environmental temperature of the communication apparatus 1) and without obtaining the aging information.

With regard to the embodiment explained above, the following additional statements are further disclosed.

(Additional Statement 1)

A control apparatus which controls a signal processing unit, the signal processing unit being mounted within a case and including a waveform shaping unit which performs a waveform shaping process on an inputted signal, the control apparatus including:

an obtaining device which obtains at least one of (i) mounting information indicating a mounting state of the signal processing unit within the case, (ii) temperature information indicating a processing unit temperature which is a temperature of the signal processing unit, and (iii) processing unit characteristic information indicating characteristics unique to the signal processing unit; and an adjusting device which adjusts waveform shaping characteristics of the waveform shaping unit, on the basis of at least one of the mounting information, the temperature information and the processing unit characteristic information obtained by the obtaining device.

(Additional Statement 2)

The control apparatus according to the additional statement 1, wherein the obtaining device obtains the mounting information and the processing unit characteristic information, the obtaining device obtains the temperature information by calculating the processing unit temperature on the basis of the obtained mounting information and the obtained processing unit characteristic information, and the adjusting device adjusts the waveform shaping characteristics on the basis of the temperature information and the processing unit characteristic information.

(Additional Statement 3)

The control apparatus according to the additional statement 2, further including a measuring device which measures an environmental temperature around the case or within the case, the obtaining device calculating the processing unit temperature by adding a temperature fluctuation according to the mounting information and the processing unit characteristic information to the environmental temperature.

(Additional Statement 4)

The control apparatus according to the additional statement 1, wherein the obtaining device further obtains aging information indicating a degree of aged deterioration of the signal processing unit, and the adjusting device adjusts the waveform shaping characteristics on the basis of at least one of the mounting information, the temperature information, the processing unit characteristic information, and the aging information.

(Additional Statement 5)

The control apparatus according to the additional statement 1, wherein the case includes therein a transmission line in which a signal is supplied from the signal processing unit, the obtaining device further obtains line characteristic information indicating characteristics which is unique to the transmission line, and the adjusting device adjusts the waveform shaping characteristics on the basis of at least one of the mounting information, the temperature information, the processing unit characteristic information, and the line characteristic information.

(Additional Statement 6)

The control apparatus according to the additional statement 1, wherein the processing unit characteristic information is stored in advance within the signal processing unit, and the obtaining device obtains the processing unit characteristic information stored in advance.

(Additional Statement 7)

The control apparatus according to the additional statement 1, wherein the signal processing unit further includes a measurement unit which measures characteristics of the signal processing unit, the obtaining device obtains the processing unit characteristic information by obtaining the characteristics measured by the measuring unit, and the adjusting device adjusts the waveform shaping characteristics on the basis of the processing unit characteristic information.

(Additional Statement 8)

The control apparatus according to the additional statement 1, wherein at least two signal processing units are mounted within the case, one of the at least two signal processing units transmits the signal to the other of the at least two signal processing units, the adjusting device adjusts the waveform shaping characteristics by outputting adjustment information for adjusting the waveform shaping characteristics to the at least two signal processing units, and the at least two signal processing units apply the adjustment information to the waveform shaping unit at timing of being mutually synchronized.

(Additional Statement 9)

The control apparatus according to the additional statement 1, wherein at least two signal processing units are mounted within the case, one of the at least two signal processing units transmits the signal to the other of the at least two signal processing units, the adjusting device adjusts the waveform shaping characteristics by outputting adjustment information for adjusting the waveform shaping characteristics to the at least two signal processing units, the adjusting device outputs timing information indicating timing at which the adjustment information is applied to the waveform shaping unit, to the at least two signal processing units, and the at least two signal processing units apply the adjustment information to the waveform shaping unit at the timing indicated by the timing information.

(Additional Statement 10)

The control apparatus according to the additional statement 2, further including a storing device which stores temperature correspondence information indicating a correspondence relation between the processing unit temperature and at least one of the mounting state indicated by the mounting information and the characteristics which is unique to the signal processing unit indicated by the processing unit characteristic information, the obtaining device calculating the processing unit temperature on the basis of the mounting information, the processing unit characteristic information and the temperature correspondence information.

(Additional Statement 11)

The control apparatus according to the additional statement 2, further including a storing device which stores waveform shaping correspondence information in which an adjustment aspect of the waveform shaping characteristics is associated with at least one of the processing unit temperature and the characteristics which is unique to the signal processing unit indicated by the processing unit characteristic information, the adjusting device adjusting the waveform shaping characteristics on the basis of the temperature information, the processing unit characteristic information, and the waveform shaping correspondence information.

(Additional Statement 12)

The control apparatus according to the additional statement 1, wherein the signal processing unit can be arbitrarily attached to and detached from the case, the obtaining device obtains at least one of the mounting information, the temperature information, and the processing unit characteristic information, triggered by the attachment of the signal processing unit to the case, and the adjusting device adjusts the waveform shaping characteristics of the waveform shaping unit on the basis of at least one of the mounting information, the temperature information, and the processing unit characteristic information, triggered by the attachment of the signal processing unit to the case.

(Additional Statement 13)

The control apparatus according to the additional statement 1, wherein the case includes a back wiring board as a transmission line.

(Additional Statement 14)

A control method which controls a signal processing unit,

The signal processing unit being mounted within a case and including a waveform shaping unit which performs a waveform shaping process on an inputted signal, the control method includes:

obtaining at least one of (i) mounting information indicating a mounting state of the signal processing unit within the case, (ii) temperature information indicating a processing unit temperature which is a temperature of the signal processing unit, and (iii) processing unit characteristic information indicating characteristics unique to the signal processing unit; and adjusting waveform shaping characteristics of the waveform shaping unit, on the basis of at least one of the obtained mounting information, the obtained temperature information and the obtained processing unit characteristic information.

(Additional Statement 15)

A signal processing apparatus including:

a case;

a signal processing unit which is mounted within a case and which includes a waveform shaping unit, the waveform shaping unit performing a waveform shaping process on an inputted signal; and a control apparatus, the control apparatus including:

an obtaining device which obtains at least one of (i) mounting information indicating a mounting state of the signal processing unit within the case, (ii) temperature information indicating a processing unit temperature which is a temperature of the signal processing unit, and (iii) processing unit characteristic information indicating characteristics unique to the signal processing unit; and an adjusting device which adjusts waveform shaping characteristics of the waveform shaping unit, on the basis of at least one of the mounting information, the temperature information and the processing unit characteristic information obtained by the obtaining device.

(Additional Statement 16)

The signal processing apparatus according to the additional statement 15, wherein the signal processing unit is a signal transceiver which performs at least one of a transmission and a reception of the signal, and the signal processing apparatus is a communication apparatus which performs communication of the signal between the signal processing unit via a transmission line included in the case.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control apparatus which controls a signal processing unit,
the signal processing unit being mounted within a case and including a waveform shaping unit which performs a waveform shaping process on an inputted signal,
the control apparatus comprising:
an obtaining device which obtains (i) mounting information indicating a mounting state of the signal processing unit within the case and (ii) processing unit characteristic information indicating characteristics which is unique to the signal processing unit, and further obtains (iii) temperature information indicating a processing unit temperature which is a temperature of the signal processing unit by calculating the processing unit temperature on the basis of the obtained mounting information and the obtained processing unit characteristic information; and
an adjusting device which adjusts waveform shaping characteristics of the waveform shaping unit, on the basis of the temperature information and the processing unit characteristic information obtained by the obtaining device.

2. The control apparatus according to claim 1, further comprising a measuring device which measures an environmental temperature around the case or within the case,
the obtaining device calculating the processing unit temperature by adding a temperature fluctuation according to the mounting information and the processing unit characteristic information to the environmental temperature.

3. The control apparatus according to claim 1, wherein
the obtaining device further obtains aging information indicating a degree of aged deterioration of the signal processing unit, and
the adjusting device adjusts the waveform shaping characteristics on the basis of at least one of the mounting information, the temperature information, the processing unit characteristic information, and the aging information.

4. The control apparatus according to claim 1, wherein
the case includes therein a transmission line in which a signal is supplied from the signal processing unit,
the obtaining device further obtains line characteristic information indicating characteristics which is unique to the transmission line, and
the adjusting device adjusts the waveform shaping characteristics on the basis of at least one of the mounting information, the temperature information, the processing unit characteristic information, and the line characteristics information.

5. The control apparatus according to claim 1, wherein
the processing unit characteristic information is stored in advance within the signal processing unit, and
the obtaining device obtains the processing unit characteristic information stored in advance.

6. The control apparatus according to claim 1, wherein
the signal processing unit further comprises a measurement unit which measures characteristics of the signal processing unit,
the obtaining device obtains the processing unit characteristic information by obtaining the characteristics measured by the measuring unit, and
the adjusting device adjusts the waveform shaping characteristics on the basis of the processing unit characteristic information.

7. The control apparatus according to claim 1, wherein
at least two signal processing units are mounted within the case,
one of the at least two signal processing units transmits the signal to the other of the at least two signal processing units,
the adjusting device adjusts the waveform shaping characteristics by outputting adjustment information for adjusting the waveform shaping characteristics to the at least two signal processing units, and
the at least two signal processing units apply the adjustment information to the waveform shaping unit at timing of being mutually synchronized.

8. The control apparatus according to claim 1, wherein
at least two signal processing units are mounted within the case,
one of the at least two signal processing units transmits the signal to the other of the at least two signal processing units,
the adjusting device adjusts the waveform shaping characteristics by outputting adjustment information for adjusting the waveform shaping characteristics to the at least two signal processing units,
the adjusting device outputs timing information indicating timing at which the adjustment information is applied to the waveform shaping unit, to the at least two signal processing units, and
the at least two signal processing units apply the adjustment information to the waveform shaping unit at the timing indicated by the timing information.

9. A control method which controls a signal processing unit,
the signal processing unit being mounted within a case and including a waveform shaping unit which performs a waveform shaping process on an inputted signal,
the control method comprising:
obtaining (i) mounting information indicating a mounting state of the signal processing unit within the case and (ii) processing unit characteristic information indicating characteristics unique to the signal processing unit, and further obtaining (iii) temperature information indicating a processing unit temperature which is a temperature of the signal processing unit by calculating the processing unit temperature on the basis of the obtained mounting information and the obtained processing unit characteristic information; and
adjusting waveform shaping characteristics of the waveform shaping unit, on the basis of the obtained temperature information and the obtained processing unit characteristic information.

10. A signal processing apparatus comprising:
a case;
a signal processing unit which is mounted within a case and which includes a waveform shaping unit, the waveform shaping unit performing a waveform shaping process on an inputted signal; and
a control apparatus,
the control apparatus comprising:
an obtaining device which obtains (i) mounting information indicating a mounting state of the signal processing unit within the case and (ii) processing unit characteristic information indicating characteristics which is unique to the signal processing unit, and further obtains (iii) temperature information indicating a processing unit temperature which is a temperature of the signal processing unit by calculating the processing unit temperature on the basis of the obtained mounting information and the obtained processing unit characteristic information; and an adjusting device which adjusts waveform shaping characteristics of the waveform shaping unit, on the basis of the temperature information and the processing unit characteristic information obtained by the obtaining device.

\* \* \* \* \*